United States Patent [19]

Kato et al.

[11] 4,182,021
[45] Jan. 8, 1980

[54] TOOL MAGAZINE WITH A TOOL REMOVAL DEVICE

[75] Inventors: Kiyotaka Kato, Nishio; Tadahiko Ohya, Nagoya, both of Japan

[73] Assignee: Toyoda-Koki Kabushiki-Kaisha, Aichi, Japan

[21] Appl. No.: 906,591

[22] Filed: May 16, 1978

[30] Foreign Application Priority Data

May 19, 1977 [JP] Japan ................................. 52-64452

[51] Int. Cl.² ............................................ B23Q 3/155
[52] U.S. Cl. ................................... 29/568; 29/26 A; 211/1.5
[58] Field of Search .................. 29/26 A, 568, 267; 292/207, 255; 211/1.5

[56] References Cited

U.S. PATENT DOCUMENTS

| | | | |
|---|---|---|---|
| 145,972 | 12/1873 | Shewell | 292/207 |
| 3,200,492 | 8/1965 | Lehmkuhl | 29/568 |
| 3,727,301 | 4/1973 | Tsuzuki et al. | 29/568 |

Primary Examiner—Z. R. Bilinsky
Attorney, Agent, or Firm—Oblon, Fisher, Spivak, McClelland & Maier

[57] ABSTRACT

A tool magazine is provided wherein an endless chain carrying a plurality of tool sockets is guided on a magazine frame and is indexable to present to a removal station one of the tool sockets receiving a desired tool. An operating arm mechanism carrying a push rod is pivotably supported on the magazine frame. A foot-operated lever, pivotably carried on the magazine frame, is linked with the operating arm mechanism and, when trodden, causes the push rod to push out the desired tool from the one of the tool sockets. A locking device is further provided on the magazine frame for locking the operating arm mechanism each time the same is retracted to its original angular position after pushing-out of the desired tool. Thus, the foot-operated lever is prevented from operation unless the locking device is manipulated to release the operating arm from thereby locking.

9 Claims, 6 Drawing Figures

TOOL MAGAZINE WITH A TOOL REMOVAL DEVICE

BACKGROUND OF THE INVENTION

1. Field of the Invention

The present invention relates generally to a tool magazine for removably storing a plurality of tools and more particularly, to a tool magazine having a tool removal device of the type that a foot-operated lever is trodden for removing a desired tool from one of tool sockets having been presented to a removal station.

2. Description of the Prior Art

In a known tool magazine with such a tool removal device, there are provided an operating arm pivotably carried on a magazine frame, a push rod connected with the operating arm, and a foot-operated lever linked with the operating arm for pivotally moving the same. The lever, when trodden by an operator, causes a front end of the push rod to reach abutting engagement with a rear end of a tool being received in a tool socket, so that the tool is pushed out from the tool socket. In order to make it easy for the operator to tread the foot-operated lever, the same is disposed in the same height as the top of a platform on which the operator works. However, this undesirably causes the operator to tread the lever without any intention or without knowing what he is doing, thus resulting in dropping of a tool from a tool socket whereby damage of the tool as well as wound of the operator may be taken place.

SUMMARY OF THE INVENTION

Accordingly, it is a primary object of the present invention to provide an improved tool magazine with a tool removal device capable of preventing tool removal when an operator operates the device by mistake or without any intention.

Another object of the invention is to provide an improved tool magazine with a tool removal device which needs operator's two actions, preferably, by hand and foot.

Another object of the invention is to provide an improved tool magazine with a tool removal device of the character set forth above wherein a foot-operated lever for effecting the removal of a tool from a tool socket is prevented from so acting as long as a locking device is in operation to lock an operating arm mechanism linked with the lever.

A further object of the invention is to provide an improved tool magazine with a tool removal device of the character set forth above wherein a locking device is manipulated to unlock an operating arm mechanism so as to thereby permit the actuation of a foot-operated lever, but is automatically brought into a locking condition each time the operating arm mechanism is retracted to its original angular position after tool removal.

Briefly, according to the present invention, there is provided a tool magazine with a tool removal device, which comprises a magazine frame; a plurality of tool sockets each capable of removably receiving a tool; a socket support mechanism indexably mounted on the magazine frame for carrying the plurality of tool sockets; an index device for indexing the support mechanism so as to present to a removal station, one of the tool sockets receiving a desired tool; an operating arm mechanism pivotably carried on the magazine frame for pivotal movement between first and second angular positions; a foot-operated lever pivotably carried on the magazine frame and linked with the operating arm mechanism for advancing the same from the first angular position to the second angular position when trodden, the lever being urged to retract the operating arm mechanism for the second angular position to the first angular position; a push member carried on the operating arm mechanism for acting to push out the desired tool from the one of the tool sockets being presented to the removal station when the operating arm mechanism is advanced from the first angular position to the second angular position; and a locking device provided on the magazine frame for locking the operating arm mechanism.

The locking device is able to be manipulated for unlocking the operating arm mechanism, but is brought into a locking condition each time the operating arm mechanism is retracted to the first angular position. Thus, an operator, when performing a tool removal, is requested to manipulate the locking device prior to treading the lever, so that any tool at the removal station can be prevented from falling when the operator puts his foot on the lever by mistake, or without knowing what he is doing.

BRIEF DESCRIPTION OF THE DRAWINGS

Various other objects, features and attendant advantages of the present invention will readily be appreciated as the same becomes better understood by reference to the following detailed description of a preferred embodiment thereof when considered in connection with the accompanying drawings, wherein like reference numerals designate like or corresponding parts throughout the several views, and in which.

DETAILED DESCRIPTION OF A PREFERRED EMBODIMENT

Figure 1:
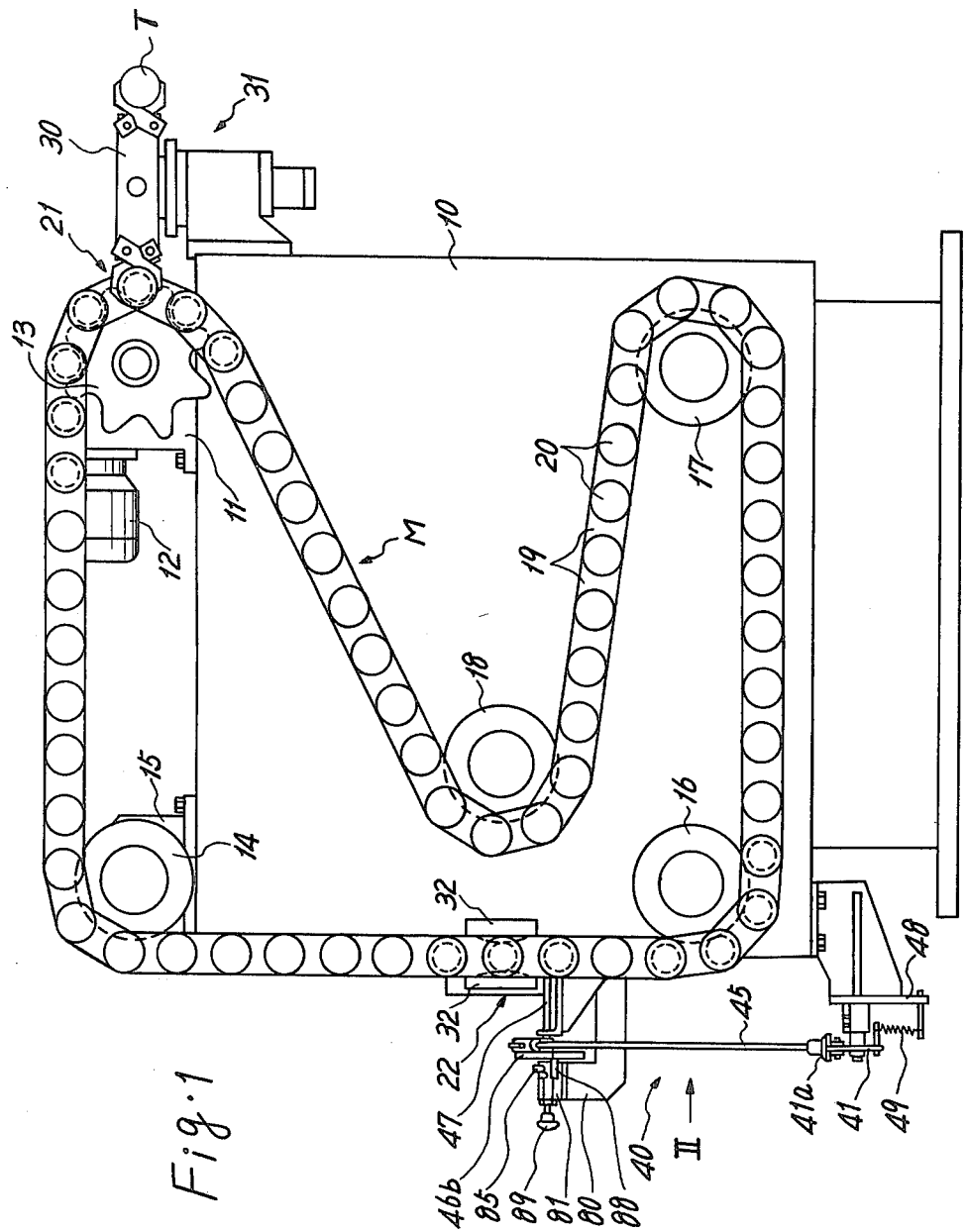
FIG. 1 is a front view of a chain type tool magazine with a tool removal device according to the present invention.

Referring now to the drawings and particularly, to FIG. 1 thereof, a tool magazine is shown having a magazine frame 10, which mounts on the top thereof an indexing drive 11 rotatably carrying a sprocket 13. This sprocket 13 is in driven connection with a motor 12 through an indexing mechanism, not shown, incorporated into the device 11 so as to be rotationally indexed thereby. The magazine frame 10 further mounts on the top thereof a position adjustable support 15 rotatably carrying a tension roll 14 and rotatably carries guide rolls 16, 17 and 18 on intermediate and lower portions thereof. An endless chain belt M, composed of chain links 19 and tool sockets 20, acting as link connection pins, is wound round the tension roll 14 and the guide rolls 16, 17, 18 and is also wound round the sprocket 13 in meshing engagement therewith. Accordingly, the chain belt M is rotationally indexed by the motor 12, whereby a desired one of the tool sockets 20 is presented to a tool exchange station indicated at 21 as well as to a tool removal station indicated at 22.

Figure 2:
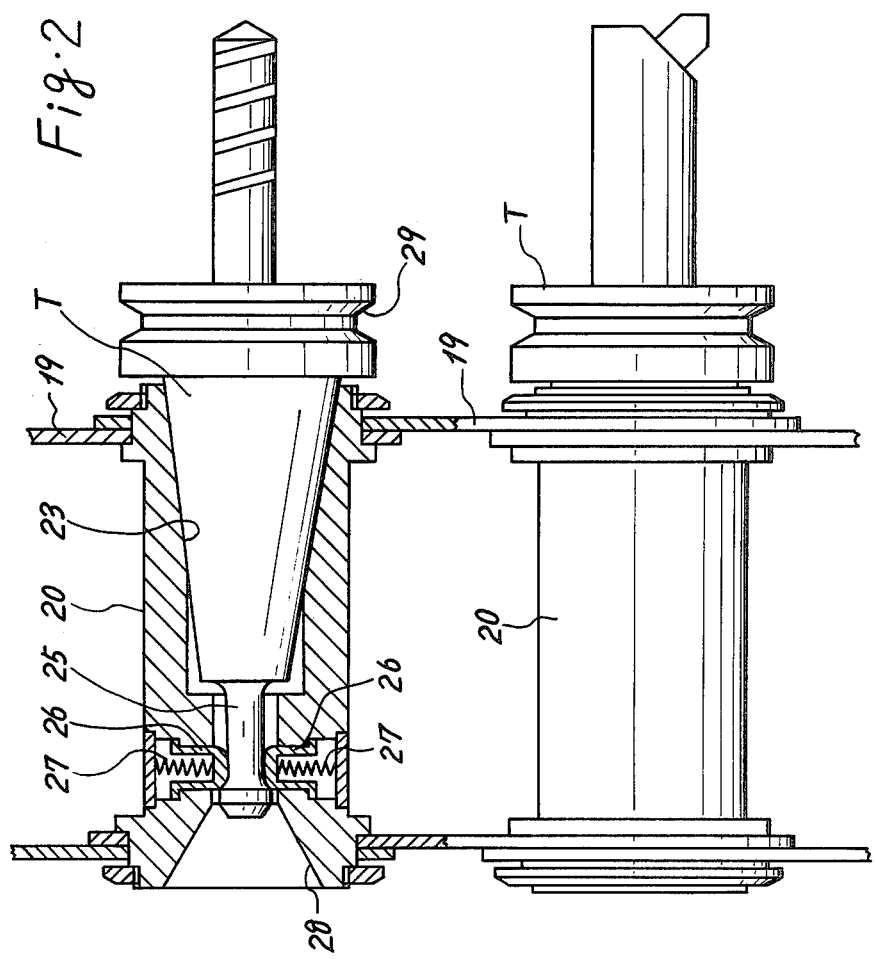
FIG. 2 is a sectional view illustrating the construction of each tool socket.

As illustrated in detail in FIG. 2, each of the tool sockets 20 is formed with a front tapered bore 23 for removably receiving a complementally tapered shank of each tool holder or tool T to be stored therein and an axial through hole 28 for permitting entry of a suitable removing member, referred to later. The through hole 28 is in communication with the tapered bore 23 and opens in the form of a tapered bore, being enlarged as it goes to the rear end of each tool socket 20. Each of the tool sockets 20 is further formed, across the axial through hole 28, with a radial through hole, not numbered, into which a pair of plungers 26 and 26 are movably fitted. The plungers 26, 26 are inwardly biased by means of springs 27 and 27 for clamping engagement with a pull stud 25 protruding from the rear end of each tool T. When needed to be removed from the tool socket 20, the tool T is either gripped at an annular recess 29 formed thereon for being subsequently axially drawn, or pushed out using the suitable removing member, which is inserted from the rear of the tool socket 20 into the axial through hole 28 for abutting engagement with the pull stud 25. At such time, the plungers 26, 26 are caused to radially outwardly move, thus releasing the tool T from clamping engagement.

A tool exchange device 31, including a tool transfer arm 30, is fixedly mounted on an upper-right portion of the magazine frame 10, as viewed in FIG. 1, and is in service to grip a tool T, being at the tool exchange station 21, at the annular recess 29 thereof, to take out the tool T and to exchange the same with a previously used tool T being received in a machine tool spindle, not shown. Further, on a lower-left portion of the magazine frame 10, there is fixedly provided a tool removal device, generally indicated at 40, for removing a tool T from the tool socket 20 having been indexed to the tool removal station 22. Indicated at reference numeral 32 are guide plates for the chain belt M, which are so constructed as to prevent movement of the chain belt M in a transversal direction thereof as well as in a direction perpendicular to the drawing sheet. The guide plates 32 are disposed in the vicinity of the tool removal device 40, so that any tool socket 20 which has been presented to the tool removal station 22 can be immovably held during a tool removing operation.

Figure 3:
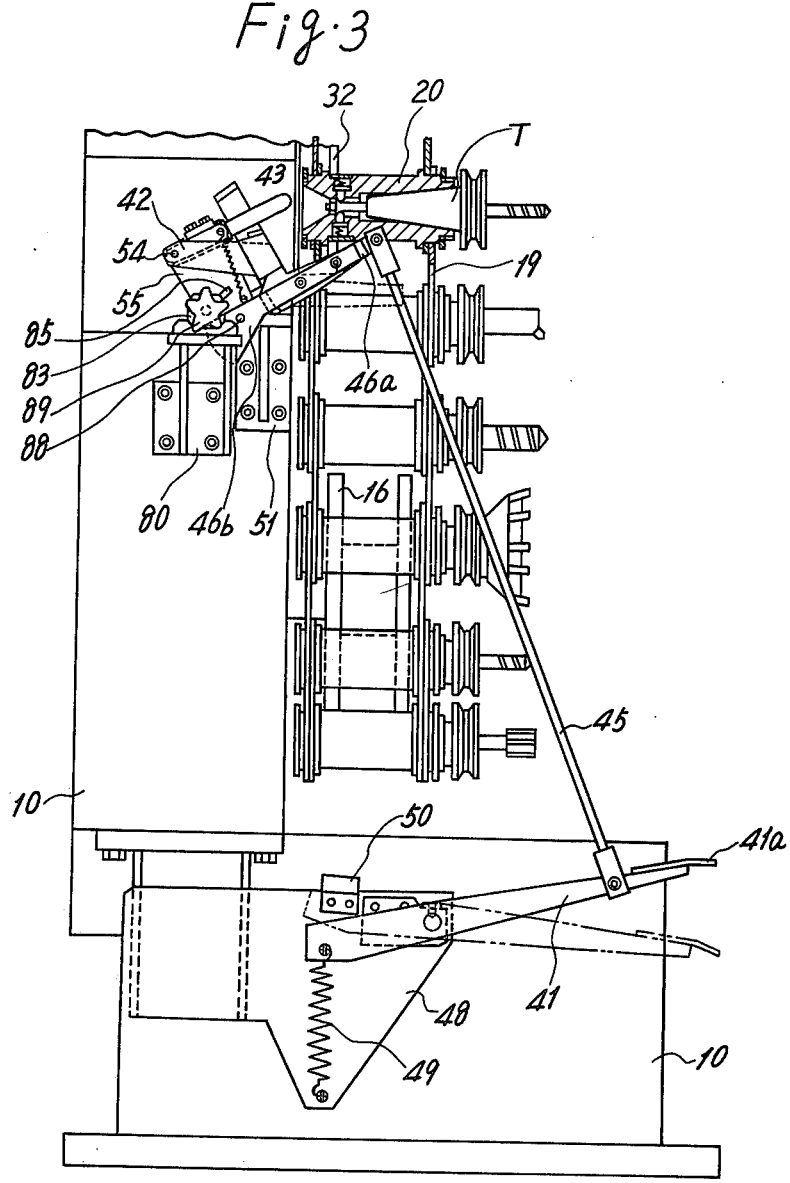
FIG. 3 is a side elevational view, partly in section, of the apparatus.
Figure 4:
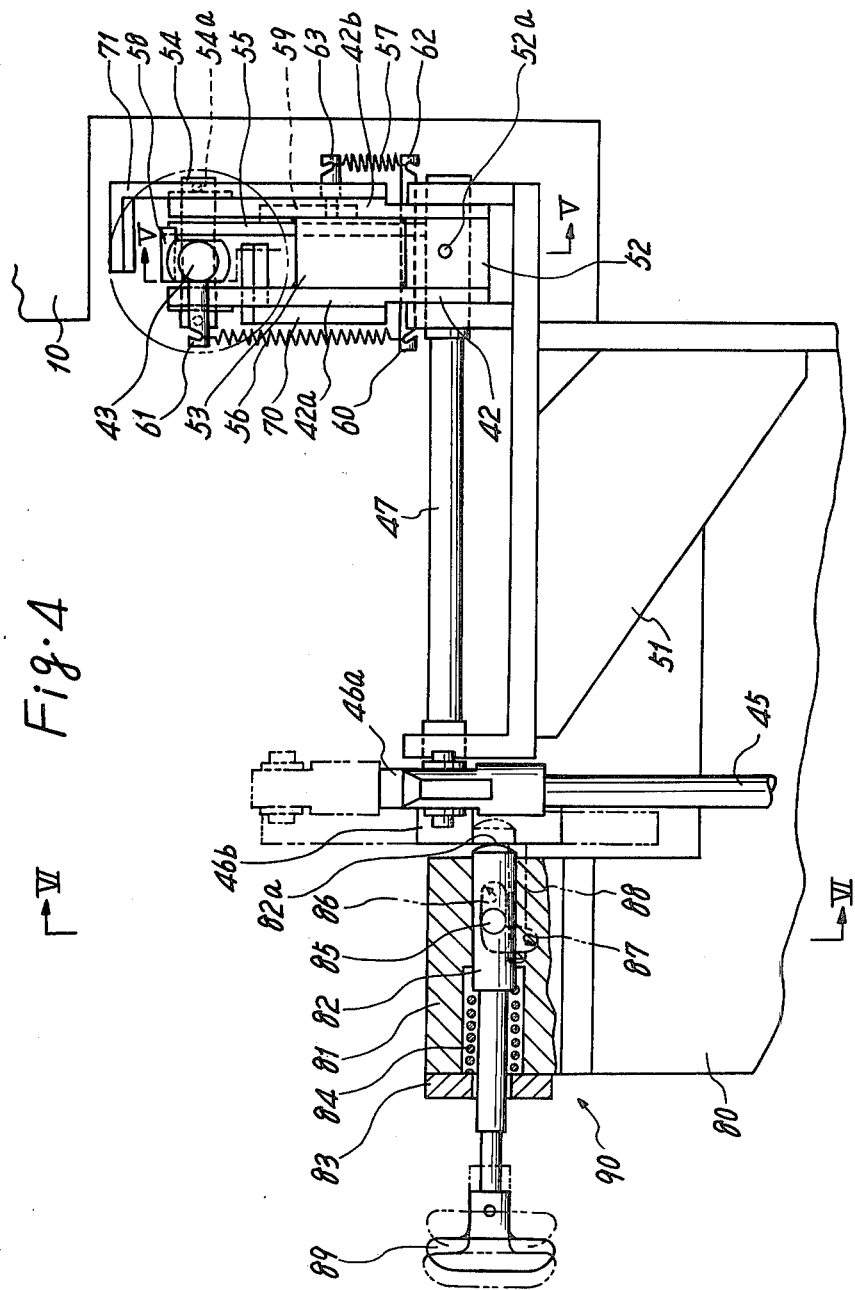
FIG. 4 is an enlarged view of an important portion of the tool removal device being in actuated state.

As best shown in FIGS. 3 and 4, the tool removal device 40 is composed, primarily, of a foot-operated lever 41, a connecting rod 45, first and second operating arms 46a and 42, a pivot shaft 47 and a push rod 43. An intermediate portion of the foot-operated lever 41 is pivotably carried by a support bracket 48 secured to the magazine frame 10, and a pedal 41a, provided on one end of the lever 41, is almost at the same height as the top of an operator's working platform, not shown. A tension spring 49 is interposed between the other end of the lever 41 opposing to the pedal 41a and the support bracket 48. The lever 41, when not trodden, is in a position as indicated by the solid line, with the spring 49 being unstretched. A stop 50 is provided in position to restrain the lowest position of the pedal 41a.

Further, the lever 41 has pivotably carried, in the vicinity of the pedal 41a, the lowermost end of the connecting rod 45, whose uppermost end is also pivotably carried on a free end of the first operating arm 46a. This arm 46a is fixed on one end of the pivot shaft 47, which is pivotably carried by a support bracket 51 secured to the magazine frame 10. The second operating arm 42 takes the form of fork, fabricated by welding a pair of arm members 42a and 42b with a connecting member 52, and is fixed by means of a pin 52a on the other end of the pivot shaft 47. A pivot shaft 54 is fixed by means of a pin 54a on the free ends of the arm members 42a and 42b. A rear end of the push rod 43, acting as the aforementioned suitable removing member, is pivotably carried on the pivot shaft 54 for pivotal movement in a plane wherein the second operating arm 42 is pivoted. The second operating arm 42 permits the indexing movement of the chain belt M when at its retracted angular position as indicated in FIG. 6, and causes the push rod 43 to push out a tool T from the tool socket 20 being at the removal station 22 when advanced to its advanced angular position as indicated in FIG. 5.

Figure 5:
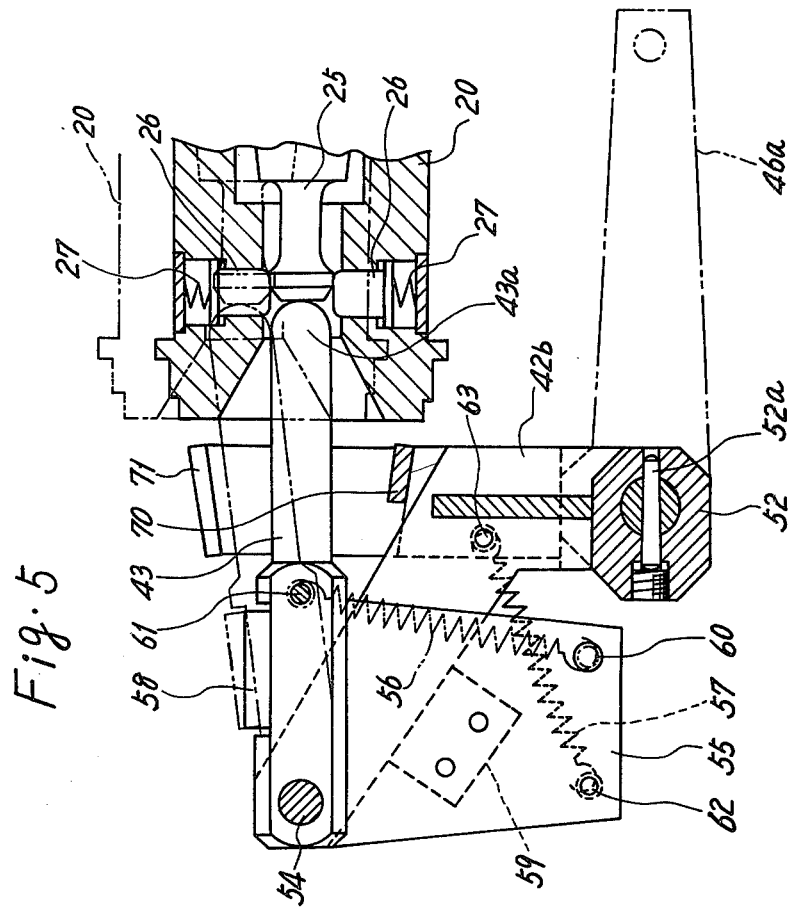
FIG. 5 is a sectional view of the tool removal device taken along the line V—V of FIG. 4.

As best shown in FIG. 5, one corner of a cradle plate 55 is pivotably carried also on the pivot shaft 54. A tension spring 56 is interposed between spring hangers 60 and 61 protruding respectively from the cradle plate 55 and the push rod 43. Another tension spring 57 is also interposed between spring hangers 62 and 63 protruding respectively from the cradle plate 55 and one of the arm members 42a and 42b. A stop 58, abuttable to the cradle plate 55, is secured to the push rod 43 for restraining clockwise movement of the push rod 43 relative to the cradle plate 55, while another stop 59, abuttable to the one of the arm members 42a and 42b, is secured to the cradle plate 55 for restraining counterclockwise movement of the cradle plate 55 relative to the second operating arm 42. In order to restrain the pivot extent of the push rod 43, a pair of stop plates 70 and 71 are provided being secured respectively to the arm members 42a and 42b. It is therefore understood that the cradle plate 55, the tension springs 56 and 57 and the stops 58 and 59 serve as a floating mechanism for maintaining the push rod 43 at a neutral position, as indicated by the solid line in FIG. 5, of a prescribed angular extent restrained by the stop plates 70 and 71 when no load is applied on the push rod 43, but for permitting the push rod 43 to pivot within the angular extent in a floating manner when load is applied on the push rod 43. Thus, a tool removal from each tool socket 20 is possible even when the tool socket 20 is positioned at the tool removal station 22 without having an exact positional relation with the push rod 43.

Figure 6:
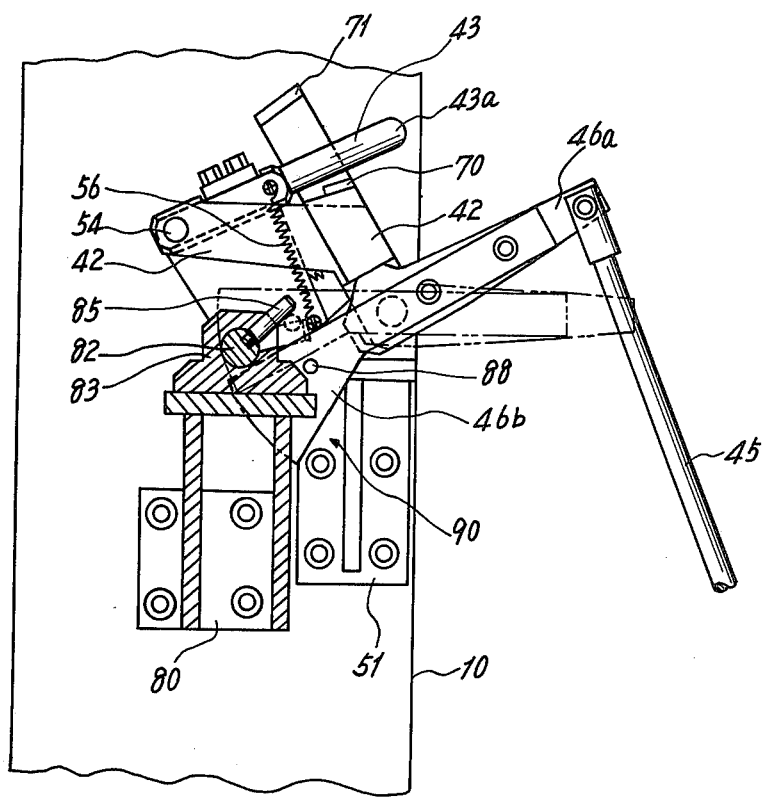
FIG. 6 is a sectional view of the tool removal device taken along the line VI—VI of FIG. 4.

In face-to-face relation with a pendulum 46b secured to the first operating arm 46a, as shown in FIGS. 4 and 6, there is provided a locking device, generally indicated at 90, which comprises a housing 81 fixedly mounted on the magazine frame 10 through a bracket 80. A locking rod 82 is supported in the housing 81 for axial sliding movement in a direction perpendicular to a plane within which the pendulum 46b is pivoted together with the first operating arm 46a. To urge the locking rod 82 toward the pendulum 46b, a compression spring 84 is interposed between the rod 82 and an end cap 83 secured to the housing 81. A knob 89 is provided in a rear end of the locking rod 82, that is the left end thereof as viewed in FIG. 4, so as to enable the operator to manipulate the rod 82. A free end of the pendulum 46b takes the form of sector, which provides a guide surface to guide the front end 82a of the rod 82. The guide surface is extended for preventing the rod 82 from coming ahead of the pendulum 46b while the operating arms 46a, 42 are departing from the retracted angular position. The pendulum 46b permits the rod 82 to come ahead thereof when the operating arms 46a, 42 are at the retracted angular position. It is noted, accordingly, that each time the operating arms 46a, 42 are moved to the retracted angular position, the rod 82 comes ahead of the pendulum 46b to lock the same, so that the operating arms 46b so as, 42 are inhibited to subsequently advance toward the advanced angular position.

The locking rod 82 is provided with a radially extending protrusion 85, the end of which is protruded outwardly over a guide recess 86. The guide recess 86 is formed on the housing 81 in parallel relation with the axis of the locking rod 82. The housing 81 is further formed with a holding recess 87, which extends perpendicular to the guide recess 86 and communicates with a rear end of the guide recess 86, namely with the left end thereof as viewed in FIG. 4. When the operator pivots the locking rod 82 in a clockwise direction as viewed in FIG. 6 after drawing the same toward the left as viewed in FIG. 4, the protrusion 85 is brought into engagement with the holding recess 87, whereby the front end of the locking rod 82 is held at a position where it no longer contacts with the pendulum 46b.

From the pendulum 46b, there is protruded a resetting member 88, which is abuttable to the protrusion 85 for releasing the same from holding by the holding recess 87. When the foot-operated lever 41 causes clockwise pivotal movement of the operating arms 46a, 42 as viewed in FIG. 3, the resetting member 88 is brought into abutting engagement with the protrusion 85, so that the protrusion 85 is moved from the holding recess 87 to the guide recess 86.

The operation of the tool removal device 40 as constructed above will be described hereinafter. When manipulation of the locking rod 82 by the operator causes the protrusion 85 to lie within the holding recess 87, the locking rod 82 is held at its retracted or unlocking position withdraw the front end 82a from contact engagement with the pendulum 46b. With the operator subsequently treading the foot-operated lever 41, the first operating arm 46a and the pendulum 46b are pivotally advanced in a clockwise direction because of the withdrawal of the locking rod 82 from the locking position and cause the pivot shaft 47 to pivot the second operating arm 42 in the same direction. In the course of the pivotal movement, the first operating arm 46a brings the resetting member 88 into abutting engagement with the protrusion 85, which is thus released from holding by the holding recess 87. Consequently, the locking rod 82 is moved toward the pendulum 46b under the action of the spring 84 and brings its front end 82a into contact engagement with the guide surface of the pendulum 46b.

When the foot-operated lever 41 reaches its lowered end, the front end 43a of the push rod 43 is brought into abutting enagement with the rear end of a tool T having been at the tool removal station 22, whereby the tool T is pushed out from a tool socket 20 associated therewith. It is herein noted that although the pendulum 46b is also pivoted during this time, the front end 82a of the locking rod 82 is maintained in contact engagement with the guide surface of the pendulum 46b, since the free end of the same takes the form of sector.

Upon completion of such tool removal, the foot-operated lever 41 is released from being trodden and is restored to its original position under the action of the spring 49. As the operating arms 46a, 42 are pivoted in counterclockwise direction so as to return to the retracted angular position thereof, no contact engagement is made between the front end 82a of the locking rod 82 and the guide surface of the pendulum 46b, whereby the locking rod 82 is advanced by the force of the spring 84 to the locking position as shown by the dot-dash-line in FIG. 4. At the locking position, the locking rod 82 lies ahead of the pendulum 46b. Accordingly, even when the operator subsequently treads the foot-operated lever 41 by mistake, the lever 41 cannot be downwardly pivoted since the operating arms 46a, 42 have been inhibited to pivot, and this results in preventing the tool T from being taken out by mistake.

It is to be noted that in order to inhibit pivotal movement of the operating arms 46a, 42, the pendulum 46b may be formed with a hole or a depression which is capable of snugly receiving the locking rod 82 only when the operating arms 46a, 42 reach the retracted angular position as shown in FIG. 6. It is to be also noted that the first operating arm 46a carrying the pendulum 46b may be integral with the second operating arm 42.

As mentioned previously, in a tool magazine with a tool removal device according to the present invention, the locking device is provided which locks the operating arm each time the same is retracted to the original angular position after a tool removal and which needs operator's manipulation to unlock the operating arm. Accordingly, when the operator puts his foot on the foot-operated lever, linked with the operating arm, by mistake, the lever is inhibited to be pivotally moved, so that no tool can be removed from a tool socket having been presented to the tool removal station. This advantageously results in preventing a tool removal from being performed by the operator's mistake, and damage to a tool and wounding of the operator which may be effected due to falling of the tool can be avoided.

Obviously, numerous modifications and variations of the present invention are possible in light of the above teachings. It is to be understood, therefore, that within the scope of the appended claims, the invention may be practiced otherwise than as specifically described herein.

What is claimed as new and desired to be secured by Letters Patent of the United States is:

1. A tool magazine with a tool removal device comprising:
   a magazine frame;
   a plurality of tool sockets each capable of removably receiving a tool;
   socket support means indexably mounted on said magazine frame for carrying said plurality of said tool sockets;
   indexing means for indexing said socket support means so as to present to a removal station one of said tool sockets receiving a desired tool;
   operating arm means pivotably carried on said magazine frame for pivotal movement between first and second angular positions;
   a foot-operated lever pivotably carried on said magazine frame and linked with said operating arm means for advancing the same from said first angular position to said second angular position when trodden, said foot-operated lever being urged to retract said operating arm means from said second angular position to said first angular position;
   a push member carried on said operating arm means for acting to push out said desired tool from one of said tool sockets being at said removal station when said operating arm means is advanced to said second angular position;

a locking member axially movable in a direction perpendicular to a plane within which said operating arm means is pivotally moved and capable of entering into a locking position to lock said operating arm means each time the same is retracted to said first angular position;

urging means for urging said locking member to move toward said locking position;

holding means for holding said locking member at an unlocking position distanced from said locking position after said locking member is manually moved from said locking position to said unlocking position against said urging means; and release means cooperable with said locking means for releasing said locking member from holding by said holding means when said operating arm means is advanced from said first angular position to said second angular position.

2. A tool magazine as set forth in claim 1, further comprising:

a locking member housing fixed on said magazine frame which rotatably and slidably supports said locking member, said housing being formed with a guide groove extending in parallel relation with sliding movement of said locking member and a holding groove communicating with said guide groove and extending perpendicularly thereto; and said holding means comprising a protrusion radially protruding from said locking member and slidable within said guide groove and said holding groove, said protrusion being held within said holding groove when holding said locking member at said unlocking position.

3. A tool magazine as set forth in claim 2, wherein:

said release means comprises a resetting member provided on said operating arm means and abuttable to said protrusion for moving the same from said holding groove to said guide groove so as to permit said locking member to move toward said locking position when said operating arm means is advanced toward said second angular position.

4. A tool magazine as set forth in claim 3, wherein:

said operating arms means is formed with a guide surface engageable with said locking member for preventing the same from entering into said locking position while said operating arm means is departing from said first angular position.

5. A tool magazine as set forth in claim 4, wherein said operating arm means comprises:

a pivot shaft pivotably carried on said magazine frame in perpendicular relation with the axis of said one of said tool sockets being at said removal station;

a first operating arm fixed on said pivot shaft and linked with said foot-operated lever, said first operating arm providing thereon said guide surface and said resetting member; and a second operating arm fixed on said pivot shaft and carrying said push member.

6. A tool magazine as set forth in claim 1, wherein said push member carried on said operating arm means is pivotable in a plane wherein said operating arm means is pivoted, further comprising:

stop means provided on said operating arm means for restraining pivotal movement of said push member relative to said operating arm means; and floating means interposed between said operating arm means and said push member for maintaining said push member at a neutral position of a prescribed angular extend restrained by said stop means when no load is applied on said push member, but for permitting said push member to pivot within said prescribed angular extent in a floating manner when load is applied on said push member.

7. A tool magazine as set forth in claim 6, wherein:

each of said tool sockets opens at its rear end a tapered bore for easily receiving said push member so as to permit the same to push out one of said tools received therein; and said prescribed angular extent restrained by said stop means depends upon a size of said tapered bore.

8. A tool magazine as set forth in claim 7, wherein said floating means comprises:

a cradle member carried on said operating arm means for pivotal movement about the same axis as for said push member;

a first spring interposed between said cradle member and said operating arm means for urging said cradle member to pivot in one direction;

a first stop secured to said cradle member and abuttable to said operating arm means for restraining pivotal movement of said cradle member in said one direction;

a second spring interposed between said cradle member and said push member for urging said push member to pivot in the other direction; and a second stop secured to said push member and abuttable to said cradle member for restraining pivotal movement of said push member in said the other direction.

9. A tool magazine as set forth in claim 8, wherein said socket support means comprises:

a plurality of guide rolls rotatably carried on said magazine frame; and an endless chain belt wound round said plurality of said guide rolls and supporting said plurality of said tool sockets.

* * * * *